(12) United States Patent
Scott et al.

(10) Patent No.: US 10,411,469 B2
(45) Date of Patent: Sep. 10, 2019

(54) REACTIVE POWER CONTROL INTEGRATED WITH RENEWABLE ENERGY POWER INVERTOR

(71) Applicant: Inventus Holdings, LLC, Juno Beach, FL (US)

(72) Inventors: Michael A. Scott, Palm Beach Gardens, FL (US); Carmine A. Priore, III, Wellington, FL (US); Gregory F. Ellena, Palm Beach Gardens, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 140 days.

(21) Appl. No.: 15/834,780

(22) Filed: Dec. 7, 2017

(65) Prior Publication Data

US 2019/0181639 A1  Jun. 13, 2019

(51) Int. Cl.
  *H02J 3/18* (2006.01)
  *H02J 3/38* (2006.01)

(52) U.S. Cl.
  CPC ............ *H02J 3/1871* (2013.01); *H02J 3/383* (2013.01)

(58) Field of Classification Search
  CPC ................................ H02J 3/1871; H02J 3/383
  See application file for complete search history.

(56) References Cited

U.S. PATENT DOCUMENTS

| | | | |
|---|---|---|---|
| 4,365,190 A | 12/1982 | Pasternack et al. | |
| 5,594,630 A | 1/1997 | Baker | |
| 5,751,138 A | 5/1998 | Venkata et al. | |
| 6,075,350 A | 6/2000 | Peng | |
| 8,076,802 B2 | 12/2011 | Fornage | |
| 8,195,338 B2 | 6/2012 | Feng et al. | |
| 8,450,878 B2 | 5/2013 | Rada et al. | |
| 8,674,544 B2 | 3/2014 | Rada et al. | |
| 8,907,615 B2 | 12/2014 | Mills-Price et al. | |

(Continued)

FOREIGN PATENT DOCUMENTS

| | | |
|---|---|---|
| AU | 721378 B2 | 6/2000 |
| AU | 2010215876 B2 | 8/2010 |

(Continued)

OTHER PUBLICATIONS

Eyer, et al., "Energy storage for the electricity grid: Benefits and market potential assessment guide." Sandia National Laboratories, Oct. 20, 2010: 5. https://www.smartgrid.gov/files/energy_storage.pdf.

(Continued)

*Primary Examiner* — Robert L Deberadinis
(74) *Attorney, Agent, or Firm* — Jeffrey N. Giunta; Fleit Gibbons Gutman Bongini & Bianco P.L.

(57) ABSTRACT

Systems and methods to incorporate control of reactive power produced by a variable reactive power output inverter that is installed in an existing installed power generation site. A reactive power output command value limiter is integrated with the variable reactive power output inverter. The reactive power command limiter iteratively: receives a reactive power command value, determines a threshold reactive power output value based on present real power output, determines that the reactive power command value exceeds the threshold reactive power output value, changes, based on the determining that the reactive power command value exceeds the threshold reactive power output value, the reactive power output command input value to a limited value reactive power output command that is one of equal to or less than the threshold reactive power output value, and outputs the limited value reactive power output command to the variable reactive power output inverter.

17 Claims, 6 Drawing Sheets

(56) References Cited

U.S. PATENT DOCUMENTS

| | | |
|---|---|---|
| 8,935,111 B2 | 1/2015 | Vartanian et al. |
| 9,134,746 B2 | 9/2015 | Divan et al. |

FOREIGN PATENT DOCUMENTS

| | | | |
|---|---|---|---|
| AU | 2015280694 A1 | 12/2015 | |
| CA | 2608741 A1 | 11/2006 | |
| CN | 1933274 B | 3/2007 | |
| CN | 101409450 B | 5/2011 | |
| CN | 102386622 A | 10/2013 | |
| GB | 2350733 A | 6/2000 | |
| JP | 2014233126 A | 12/2014 | |
| WO | 2012010052 A1 | 1/2012 | |

OTHER PUBLICATIONS

Biswas, Rajashree. "Active power filter based on interleaved buck converter." http://ethesis.nitrkl.ac.n/4643/1/211EE2127.pdf. 2013.

Elsaidi, Abdulsalam, "Photovoltaic (PV) type solar generators and their effect on distribution systems." University of Missouri-Kansas City, 2013. https://media.proquest.com/media/pq/classic/doc/3095351401/fmt/ai/rep/NPDF?_s=5b1YJkiU1rkGI79VohfuQAFavKA%3D.

Singh, M., V. Khadkikar, and Ambrish Chandra. "Grid synchronisation with harmonics and reactive power compensation capability of a permanent magnet synchronous generator-based variable speed wind energy conversion system." IET Power Electronics 4.1 (2011): 122-130. http://azadproject.ir/wp-content/uploads/2013/12/p87_Grid-synchronisation-with-withharmonics-magnet.

Lai, Jih-Sheng, et al. "Multilevel converters—a new breed of power converters." IEEE Transactions on industry applications 32.3 (1996): 509-517. http://www.academia.edu/download/25510428/lai_multilevel.pdf.

Brucke, Paul, "Reactive Power Control in Utility-Scale PV Utility Requirements and PV Inverter Capabilities," SolarPro Issue 7.4, Jun./Juny. 2014. http://solarprofessional.com/articles/design-installation/reactive-power-control-in-utility-scale-pv#.WimgwUuWxZR.

REACTIVE POWER CONTROL INTEGRATED WITH RENEWABLE ENERGY POWER INVERTOR

FIELD OF THE DISCLOSURE

The present disclosure generally relates to the operation of electrical power generation equipment, and more particularly to controlling reactive power characteristics of power produced by electrical generators.

BACKGROUND

Some types of electrical generation equipment, such as renewable energy sources including photovoltaic solar generation sites, generate electrical energy in the form of Direct Current (DC) electrical power. The DC electrical power produced by these systems is converted by an electrical power inverter into Alternating Current (AC) electrical power that is able to be directly provided to an electrical transmission or distribution grid.

AC electrical power generally consists of what is referred to as "real" power and "reactive" power. Reactive power refers to components of AC electrical power where the electrical current is ninety degrees (90°) out of phase with the electrical voltage present on the line. Real power refers to the electrical power components where the electrical current is in-phase with the voltage. In general, AC electrical power often has current that is not completely in-phase with voltage and thus some reactive power is present along with real power. The presence of reactive power on an electrical transmission or distribution line causes the voltage that is present on the line to vary from a nominal voltage for that line. In some examples, devices are installed along electrical transmission or distribution lines that are able to produce or consume reactive power. These devices operate to regulate the voltage on the transmission line to maintain a stable and constant voltage by varying the amount of reactive power they produce or consume based on measured deviations of voltage on the transmission or distribution line where that device is located. Such regulation reduces that voltage deviation and reduces the difference between the present and the nominal voltage on the electrical transmission or distribution system.

Some electrical power inverters used to convert DC electrical power from renewable energy sources to AC electrical power are able to be configured or adjusted as they are operating to produce or consume a specified amount of reactive electrical power. Some electrical power inverters are able to produce or consume an amount of reactive power equal to the inverter's full power rating, even when the amount of DC electrical power being provided to the electrical power inverter is low. The real power produced on the AC output of the electrical power inverter is limited by the amount of DC power that is provided as in input to the electric power inverter. In such examples when the DC power input to the electric power inverter is low, the electric power inverter is able to produce or consume a relatively large amount of reactive power even while it produces only a small amount of real power.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
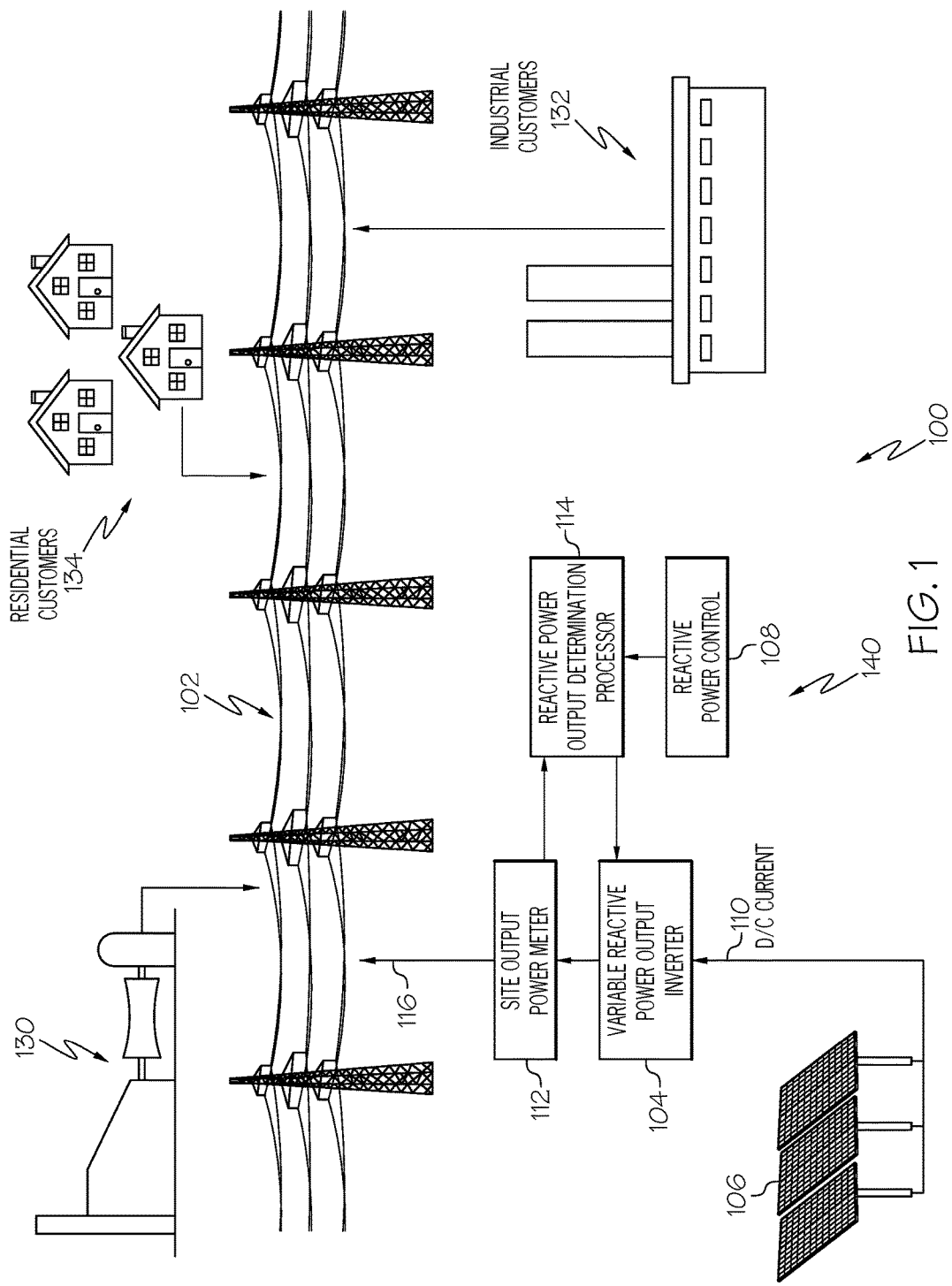
FIG. 1 illustrates an electrical transmission system connections diagram 100, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods describe controlling electrical power inverters that are able to generate or consume variable amounts of reactive power, and methods of operating such inverters, so as to reduce adverse impacts on electrical transmission and/or distribution systems to which they are delivering power. In an example, the below described system and methods operate to control or limit the reactive electrical power output of a variable reactive power output inverter based on the amount of real electrical power being produced by the inverter at about the same time.

In some examples, the amount of reactive power that a power generation facility is to generate or consume at a given time is determined based on a presently measured voltage level that is present on the transmission or distribution system to which the inverter is connected. As is understood by practitioners of ordinary skill in the relevant arts, the presence of a voltage lower than a nominal voltage for a transmission or distribution system indicates that the inverter should produce reactive power to correct the voltage level, while a voltage higher than that nominal voltage indicates the presence of an excessive amount of reactive power that should be consumed by the inverter. The nominal voltage of a transmission or distribution system is generally the voltage at which the system is designed to operate.

In some examples, the values that are used to determine the amount of reactive power that an inverter is to generate or consume, such as deviations of line voltages from nominal voltages on the distribution system power line, are processed by a Proportional/Integral (PI) control process. Such a control process in some examples is able to have an appreciable response time that delays adjustments to the reactive output power level based on changes in voltages present at the connection of the inverter to the transmission or distribution system. The delay in these responses in some examples is able to result in an undesirable overshoot of reactive power output or consumption in some circumstances, and a corresponding decrease or increase in voltage along the transmission system to which the inverter is connected.

In an example, a large photovoltaic solar cell site provides DC power to a variable reactive power output inverter that in turn is connected to an electrical transmission system. In such an example, when the sun rises the photovoltaic cells transition from producing no power to starting to produce DC power at a relatively low level. In some examples, the electrical transmission system in the early morning hours is lightly loaded, does not have a lot of inductive electrical consumers, or both. The low level of reactive power consumers on the transmission system, and also a Ferranti effect in some examples that is caused by "charging currents" that exist in lightly loaded transmission systems, cause a higher than nominal voltage to be present on the transmission system, and thus the reactive power output control system for the photovoltaic cell site will command the inverter to consume a high level of reactive power. Because of the relatively low level of sunlight available during sunrise, the inverter receives a low level of DC power from the solar cells and thus only able to produce an amount of real power output that is much less than the amount of reactive power that the higher transmission or distribution system line voltage indicates should be produced. Once the inverter is capable of producing real power, it can almost instantaneously produce or consume large amounts of reactive power. Consuming this high level of reactive power in such a short time has been observed to have an undesirable impact on the electrical transmission or distribution system to which the inverter is connected. For instance, the control system for such a solar cell site may overshoot the amount of reactive power to consume for several minutes during a sun rise or sun set period and cause the voltage present on the transmission system to drop below its nominal level for those several minutes.

A similar but reverse condition occurs when the sun sets on a photovoltaic solar cell site. As the sun begins to set, the amount of DC power produced by the photovoltaic solar cell site decreases. The amount of real AC power that can be produced by the invertor therefore also decreases. The invertor in some examples, however, continues to produce or consume reactive power at levels that are determined based on the regulation of the voltage present on the transmission system. In such early evening hours, this level of reactive power may be a substantial amount. When the sun does set and the DC power produced by the photovoltaic solar cell site goes to zero, the reactive power produced or consumed by the inverter also abruptly drops to zero from what may have been a substantial amount. This abrupt change has been noted to cause undesired effects in the operation of the power transmission or distribution system to which the invertor is connected.

An inverter changing its production or consumption of reactive power in such a short amount of time, such as under the above described conditions, has been observed to cause undesired variations in the line voltages present at the output of the inverter and along the transmission or distribution system to which the inverter is connected. Such undesired voltage variations may in some examples be in excess of voltage variations allowed by the operator of the transmission or distribution system.

In one example, the below described systems and methods describe a retrofitting process for an existing power generation site in which a reactive power output command value limiter is installed with an existing variable reactive power output inverter. The retrofitting of such an existing installed existing power generation site is able to mitigate the above described difficulties in the operation of such as site under conditions of low real power output.

The below described systems and methods operate to limit the amount of reactive power produced or consumed by a variable reactive power output inverter to a threshold value that is set based on the amount of real power produced by the inverter. In various examples, the threshold of reactive power is set as a percentage of the real power output of the inverter, as a percentage of the DC power provided to the inverter, as a minimum power factor for the output power produced by the inverter, according to any other suitable relationship, or as combinations of these. In so limiting the production or consumption of reactive power based on the amount of real power produced by an inverter, abrupt changes in the reactive power production or consumption by the inverter can be controlled. For example, abrupt changes in reactive power production or consumption by the inverter can be advantageously controlled during sunrise or sunset, which are occasions when the real AC output power of the inverter generally increases or decreases slowly but are times when abrupt changes in the production or consumption of reactive AC power can occur. Limiting the reactive AC power based on the slowly changing real AC power under these conditions advantageously allows smoother transitions in reactive power production or consumption during times of lower real AC power output. Such limiting operations have been observed to advantageously limit voltage spikes on the power transmission or distribution line due to abrupt changes in reactive power produced or consumed by the operating inverter.

FIG. 1 illustrates an electrical transmission system connections diagram 100, according to an example. The electrical transmission system connections diagram 100 depicts a simplified example of an electrical transmission system 102 to which various electrical sources and consumers are connected. Although the depicted example refers to an electrical transmission system 102, it is to be understood that the concepts described herein are similarly applied to any other type of electrical power conveyance system, such as distribution systems or other electric power conveyance system and the electric power sources and consumers connected to them.

The electrical transmission system connections diagram 100 includes a solar power generation site 140 that includes a variable reactive power output inverter 104, a reactive power output determination processor 114, a renewable energy source 106, such as a photovoltaic solar collection system, and a reactive power control 108. In the illustrated example, the renewable energy source 106 generates Direct Current (DC) electrical power that is provided to the variable reactive power output inverter 104 via a DC current connection 110. The variable reactive power output inverter 104 produces Alternating Current (AC) electrical power that is delivered to the electrical transmission system 102 via a site output power connection 116.

The illustrated electrical transmission system connections diagram 100 depicts industrial customers 132, residential customers 134, and other generators 130. Although these elements are each shown in one block in order to more clearly depict the relevant aspects of the illustrated examples, it is clear that a particular transmission system, such as the illustrated electrical transmission system 102, has connections to many different and physically separate industrial customer installations, residential customer installations and generators. Further, the residential customers and industrial customers are connected to the electrical transmission system 102 via various components of electrical distribution systems (not shown). In general, the industrial customers 132 and residential customers 134 depict real power consumers of electrical transmission system 102 and also potential consumers of reactive power that is fed into the electrical transmission system 102. In general, an electrical transmission system 102 will include various elements to regulate (reduce or produce) the level of reactive power present at locations along the transmission system in order to maintain a stable and constant voltage. An example of an element to regulate reactive power at a particular point of the electrical transmission system 102 is the solar power generation site 140, that includes the variable reactive power output inverter 104

The variable reactive power output inverter 104 in an example is able to receive a configuration parameter or command that sets the amount of reactive power that the variable reactive power output inverter 104 is to generate and deliver to the electrical transmission system 102. The value of this configuration parameter is able to be determined by any suitable technique as is discussed below.

In the illustrated example, a reactive power output determination processor 114 determines the amount of reactive power that the solar power generation site 140 is to produce or consume. In various examples, the reactive power output determination processor 114 operates to determine a value of the reactive power output for the site, and provides that value of the reactive power output to the variable reactive power output inverter 104. In these various examples, the reactive power output determination process provides a command or other configuration value that is suitable for reception by and control of the variable reactive power output inverter 104.

The reactive power output determination processor 114 receives information from a reactive power control 108 that can be a basis for the determination of the value of reactive power output for the site. In the illustrated example, data provided by the reactive power control 108 is based on information specified by operators of the electrical transmission system 102 regarding a range or amount of reactive power that has been allocated to the solar power generation site 140. In some examples, the reactive power control 108 is able to specify, for example; a range of voltages that is to be maintained at the site output power connection 116, a power factor to be presented by the solar power generation site 140 at the site output power connection 116, a specified value of reactive power, or any other suitable information.

In some examples, a site output power meter 112 measures quantities associated with the electric power delivered by the solar power generation site 140 to the electrical transmission system 102. In an example where the reactive power output determination processor 114 is configured to maintain a particular output voltage at the site output power connection 116, a site output power meter 112 monitors the line voltage present at the site output power connection 116 and reports the measured voltage to the reactive power output determination processor 114. In an example, the variable reactive power output inverter 104 is able to include the functionality of the site output power meter 112. Based upon the voltage measured by the site output power meter 112, the reactive power output determination processor 114 outputs a specification of an amount of reactive power that is to be produced by the variable reactive power output inverter 104. In some examples, the variable reactive power output inverter 104 is able to be directly configured to produce output power with a specified power factor or to output a specified amount of reactive power. In various examples, the reactive power output determination processor 114 provides a suitable reactive power output command in a form that can be received by the variable reactive power output inverter. In further examples, the reactive power output determination processor 114 is able to monitor real power delivered to the site output power connection 116 and adjust the amount of reactive power delivered by the variable power output inverter to achieve the specified power factor at the site output power connection 116.

In an example, the solar power generation site 140 is able to be an existing and installed solar generation site that has been retrofitted with a reactive power command value limiter, as is described in further detail below. In such an example, an existing and installed solar generation site has a variable reactive power output inverter that produces a high level of reactive power to perform voltage regulation on the transmission system 102, even during periods when the solar cells are not producing a high level of power such as sunrise, sunset, cloudy periods, or any other condition. Such a site may have a reactive power control system that operates to adjust reactive power output to regulate voltage. In an example a retrofit of such as site will install a reactive power command value limiter between the existing reactive power control system and the variable reactive power output inverter to limit the amount of presently produced reactive power based on the real power presently produced by the variable reactive power output inverter.

Figure 2:
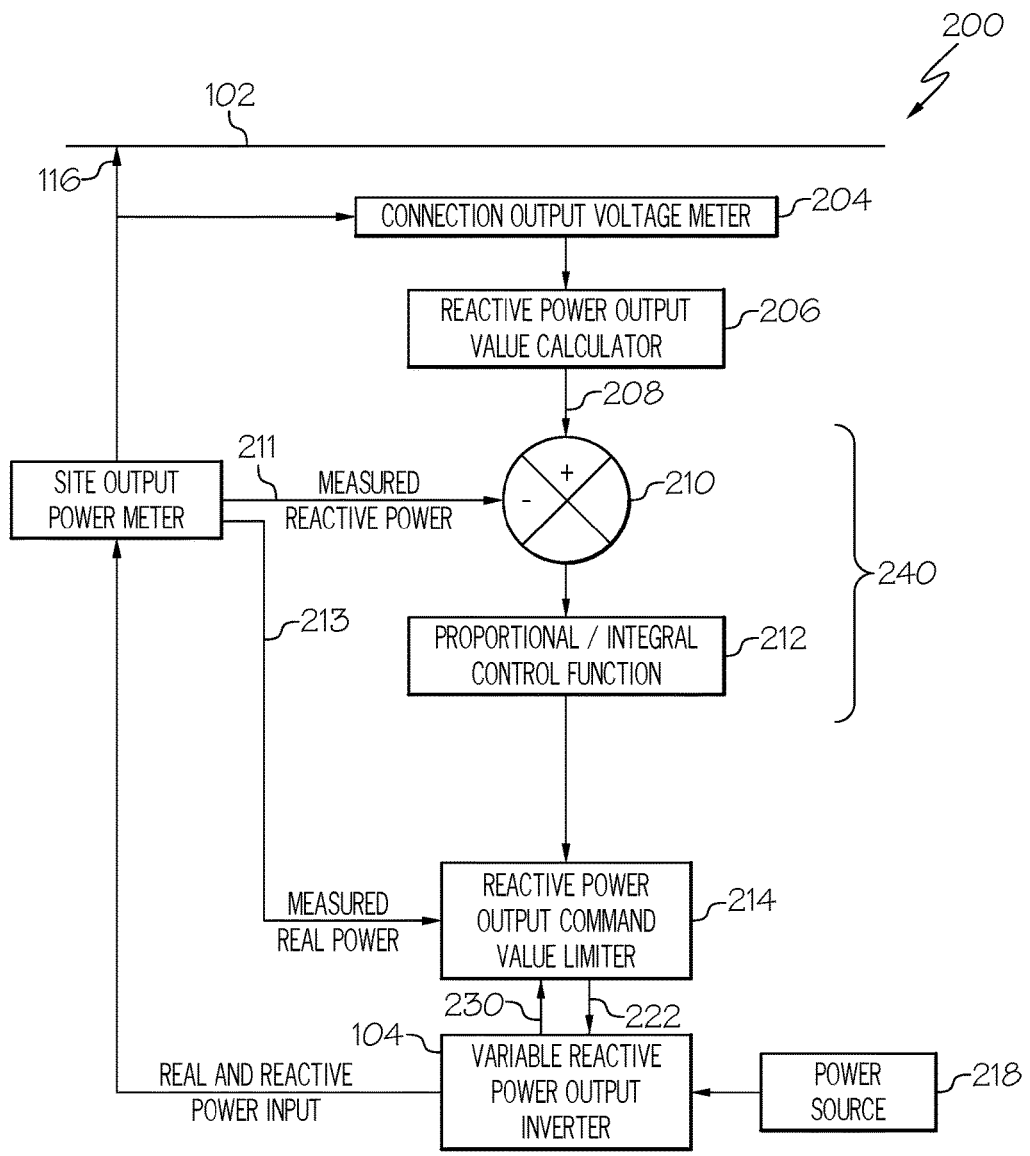
FIG. 2 illustrates reactive power output control system, according to an example.

FIG. 2 illustrates reactive power output control system 200, according to an example. The description of the reactive power output control system 200 is an example of a reactive power control processor. The description of the reactive power output control system 200 refers to the above description of the electrical transmission system connections diagram 100. The reactive power output control system 200 depicts some of the components illustrated in the electrical transmission system connections diagram 100 above, including the solar power generation site 140 and the site output power connection 116 to the electrical transmission system 102.

The reactive power output control system 200 is an example of a system that is at least partially contained within the reactive power output determination processor 114 to provide a reactive power output command to the variable reactive power output inverter 104. In various examples, portions of the reactive power output control system 200 are able to be implemented in processing hardware, software executing on a processor, or any combination of these.

The reactive power output control system 200 includes a connection output voltage meter 204. As noted above, the connection output voltage meter 204 is able to be a separate device, a component in another device present at the solar power generation site 140, such as a component of the variable reactive power output inverter 104, or a reporting device located at any suitable location to report the present voltage on conductors at, for example, the site output power connection 116.

The connection output voltage meter 204 in the illustrated example provides a present measured voltage to a reactive power output value calculator 206. In an example, an amount of reactive power to be produced or consumed by a particular generation site is a specified function of the difference between the nominal voltage of a power transmission line, and the present voltage that is measured on that transmission line. The reactive power output value calculator 206 in an example determines and provides a calculated reactive power output demand value 208.

The reactive power output control system 200 includes a difference calculator 210 and a proportional/integral control function 212. The difference calculator 210 and the proportional/integral control function 212 operate as a proportional/integral feedback control system 240 that receives a specification of the amount of reactive power to produce, and produces a reactive output power command value that is intended to control the reactive power output level of the solar power generation site 140. In the illustrated example, the difference calculator 210 receives the calculated reactive power output demand value 208. As described below, the output of the is proportional/integral feedback control system 240 is limited in an example to a maximum value that is based on the present real power output value of the solar power generation site 140 in order to limit the reactive electrical power or power factor that is presented to the electrical transmission system 102.

The difference calculator 210 receives the calculated reactive power output demand value 208 at its additive port and receives at its subtractive power, from the site output power meter 112, the measured present reactive power value 211 that indicates the present reactive power being produced by the variable reactive power output inverter 104. The output of the difference calculator 210 is the difference between the calculated reactive power output demand value 208 and the measured present reactive power value 211. As is understood by practitioners of ordinary skill in the relevant arts, the proportional/integral control function 212 receives inputs and produces an output that is proportional to a difference between those inputs and also based on a time integral of those differences.

A reactive power output command value limiter 214 in an example receives the output produced by the proportional/integral control function 212. The output produced by the proportional/integral control function 212 is an output of the feedback control loop implemented by the difference calculator and the proportional/integral control function 212. The output produced by the proportional/integral control function 212 is an example is received via a reactive power output command value input of the reactive power output command value limiter 214. The output produced by the proportional/integral control function 212 is an example of a reactive power output command input value. As described in further detail below, the reactive power output command value input is processed by the reactive power output command value limiter 214 in order to limit the amount of reactive power produced by the solar power generation site 140 to a threshold that is based on the amount of real power produced by that site.

The reactive power output command value limiter 214 receives a measured present real power output value 213 via a real power output meter interface that indicates the amount of real power produced by the variable reactive power output inverter 104 and thus the solar power generation site 140. In various examples, the reactive power output command value limiter 214 is able to receive any suitable indication that is related to the amount of real power output produced by the solar power generation site. The illustrated example depicts one source of a real power output indication that is an inverter real power output indication 230 that is a report by components within the variable reactive power output inverter 104. The illustrated example also depicts another source of an indication of real power produced by the solar power generation site 140 that is a site output power meter 112 that measures the AC power produced by the variable reactive power output inverter 104. The reactive power output command value limiter 214 determines a threshold for the amount of reactive power to produce in this latter example based on the real time AC power being produced by the variable reactive power output inverter 104.

In a further example, the real AC power output of the variable reactive power output inverter 104 may be determined based on, for example, an input power level that corresponds to the amount of DC power being provided to the variable reactive power output inverter 104. In such a further example, the real AC power output value of the variable reactive power output inverter 104 is determined based on a measured input power value of power supplying the variable reactive power output inverter 104. In various examples, the reactive power output command value limiter 214 is able to determine the amount of real AC power being presently produced by the variable reactive power output inverter 104 by any suitable technique.

A limited value reactive power output command calculator within the reactive power output command value limiter 214 processes the reactive power output command input value and, as described below, produces a limited value reactive power output command. The reactive power output command value limiter 214 outputs a limited value reactive power output command 222 via a limited value reactive power output command interface to the variable reactive power output inverter 104. The limited value reactive power output command 222 is able to be in any form, such as a specification of Volt Amps reactive (VAr), a specification of a power factor, in any other suitable form, or any combination of these.

As discussed above and in further detail below, a reactive power output command value limiter 214 is able to be provided as a retrofit into an existing power generation site. In such an example, the reactive power output command value limiter 214 is a retrofittable reactive power output command value limiter that is that is suitable for integration with a variable reactive power output inverter that is able to produce an amount of reactive power that is greater than a present real power output of the variable reactive power output inverter and where the variable reactive power output inverter is installed in an existing installed power generation site.

The variable reactive power output inverter 104 produces AC power that in an example includes the amount of real power that can be produced based on the amount of DC power received and produces an amount of reactive power that corresponds to the reactive power output command value 222. The variable reactive power output inverter 104 in this example provides AC power to a site output power connection 116 and onto the electrical transmission system 102.

Figure 3:
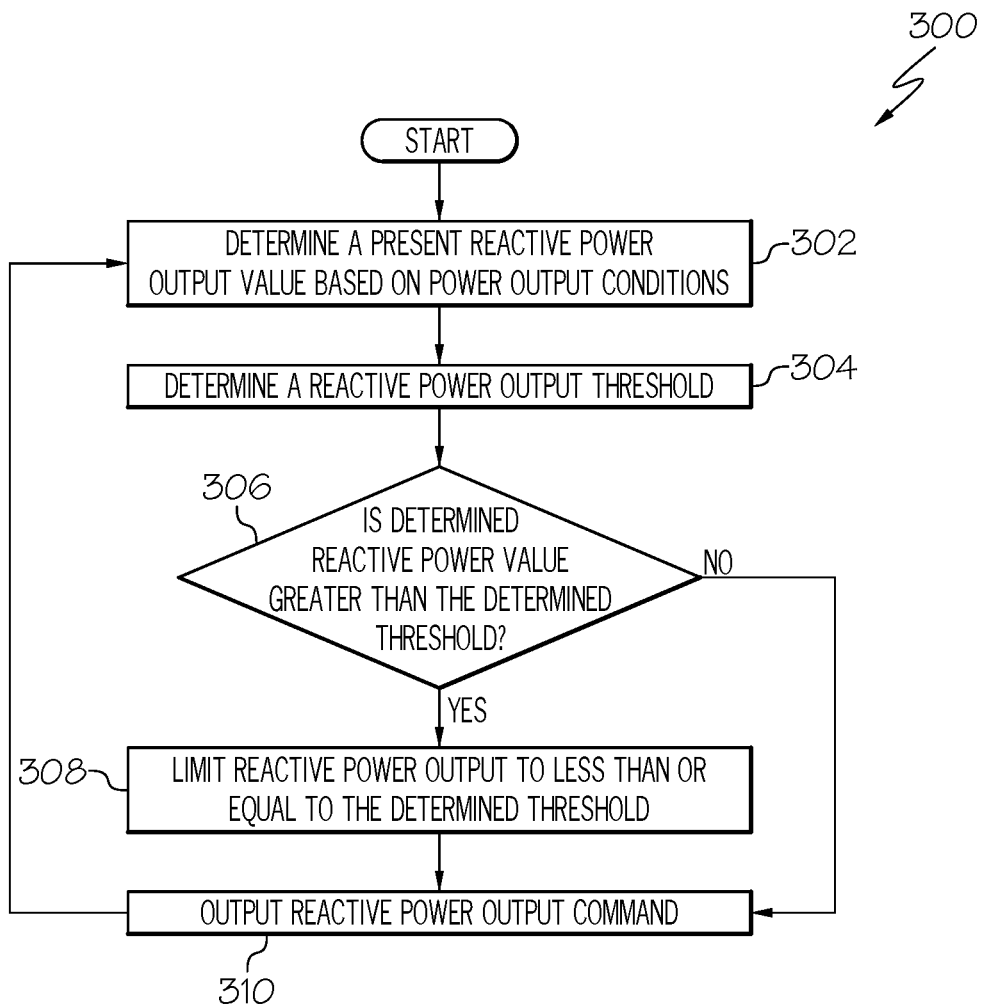
FIG. 3 illustrates a reactive power limiting process, according to an example.

FIG. 3 illustrates a reactive power limiting process 300, according to an example. The description of the reactive power limiting process 300 refers to the above described elements of the electrical transmission system connections diagram 100 and the reactive power output control system 200. The reactive power limiting process 300 is an example of a process performed by the reactive power output determination processor 114 and more particularly by a limited value reactive power output command calculator that is part of the reactive power output command value limiter 214 that are described above.

The reactive power limiting process 300 determines, at 302, a present reactive power output command value for the generation site based on power output conditions. In an example, the present reactive power output command value is based on the observed line voltage at the site output power connection 116 relative to the nominal voltage value of the transmission system. In an example, the present reactive power output command value is determined according to the processing described above with regards to the reactive power output control system 200, and more particularly is produced by the proportional/integral control function 212 and the proportional/integral feedback control system 240 as is described above.

As is discussed above, conditions may cause the determined present reactive power output value to be in excess of the real power output that can be produced by the generation site. In conventional systems, the variable reactive power output inverter 104 can be configured or commanded to produce the determined present reactive power output value even though that value of reactive power is in excess of the real power that can be produced by the site to an extent that might impact the transmission system that is receiving power from the site. In an example of a conventional solar power electrical power generation site, the inverter of such a site can be configured to produce up to its full output power rating as reactive power, even though the solar cells are producing relatively low level of DC power and thus the inverter is limited to producing a corresponding low level of real AC output power. When the variable reactive power output inverters 104 first start to generate real power in the morning or stop generating real power in the evenings, the amount of reactive power that can be produced from the solar power generation site 140 changes from zero to the rated reactive power output of the variable reactive power output inverter 104 in a very short period of time. The amount of reactive power produced or consumed by the site can change dramatically during site startup in the morning and site shutdown in the evening. This scenario causes a sudden change in reactive power output and can cause voltage transients on the transmission system 102.

A reactive power output threshold value for the reactive power output for the solar power generation site 140 is determined, at 304, as a function of the real power output of the solar power generation site 140. In an example, the threshold is determined as a percentage of the real power output produced by the variable reactive power output inverter 104. The threshold is able to be determined as an amount of reactive power output that will maintain a minimum specified power factor at the output of the variable reactive power output inverter 104. In an example, the threshold is set to be a percentage of the total real power output that corresponds to a power factor of 0.8 at the site output power connection 116.

The reactive power limiting process 300 determines, at 306, if the determined reactive power output command value is greater than the determined threshold. If the determined reactive power output command value is greater than the threshold, the reactive power output command value is limited, at 308, to a value that is less than or equal to the determined threshold. In an example, limiting the reactive power output command is able to include setting the reactive power output command to the determined reactive power output threshold. In some examples, limiting the reactive power output command is able to include setting the reactive power output command to a value that is less than the determined reactive power output threshold. The value to which the reactive power output command is set when it is limited is able to be determined based on any suitable technique.

If the determined reactive power output command value is not greater than the threshold, or after its value is limited, at 308, the reactive power output command value is output, at 310. In an example, the reactive power output command value is output and provided to the variable reactive power output inverter 104 as is discussed above. The reactive power limiting process 300 iteratively performs the above described operations by returning to determining, at 302, the reactive power output command value and the following processing as is described above.

Figure 4:
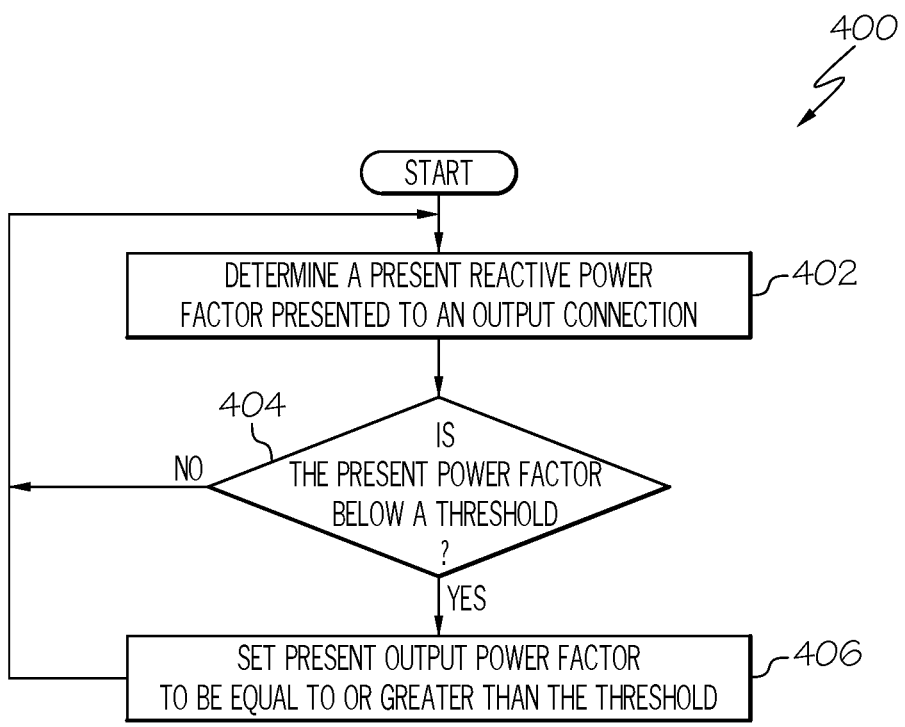
FIG. 4 illustrates a power factor limiting process, according to an example.

FIG. 4 illustrates a power factor limiting process 400, according to an example. The description of the reactive power limiting process 300 refers to the above described elements of the electrical transmission system connections diagram 100 and the reactive power output control system 200. Similar to the reactive power limiting process 300 discussed above, the power factor limiting process 400 is an example of a process performed by the reactive power output determination processor 114 and more particularly in the reactive power output command value limiter 214 that are described above. The power factor limiting process 400 operates to limit a power factor of electric power provided to the site output power connection 116, while the above described reactive power limiting process 300 operates to limit the value of a determined reactive power output command value to also effectively limit the power factor produced by the solar power generation site 140.

The power factor limiting process 400 determines, at 402, a present power factor presented to the site output power connection 116. The present power factor that is being currently produced by the solar power generation site 140 is able to be determined by any suitable technique, such as based upon data provided by the variable reactive power output inverter 104, measured values of real and reactive power, via other techniques, or by combinations of these.

A determination is made, at 404, as to whether the present power factor is below a threshold. This determination is an example of determining that a reactive power output command value for the variable reactive power output inverter exceeds the threshold reactive power output value. The threshold is able to be determined based on any suitable technique. In an example, the threshold value is a specified power factor value that is set by an operator of the electrical transmission system 102 as a minimum power factor value that the particular solar power generation site 140 is allowed at its electrical output, such as at the site output power connection 116. In an example, the power factor threshold is able to be set to a value of 0.8.

If the present power factor is determined to be below the threshold, in one example the present output power factor for power produced by the variable reactive power output inverter 104 is set, at 406, to a value that is equal to or greater than the threshold. Setting the present output power factor to a particular value is an example of outputting a reactive power output command value by setting a present output power factor for the variable reactive power output inverter 104 and is able to be achieved by any suitable technique. In an example, a command to set the present power factor to a specified value or to limit the present power factor to be above a specified value is able to be provided to the variable reactive power output inverter 104.

If the present power factor is determined, at 404, to not be below the threshold, or after the present output power factor is set to the threshold, the power factor limiting process 400 in an example returns to determining, at 402, the present power factor presented to the output power connection and with the following processing described above.

Figure 5:
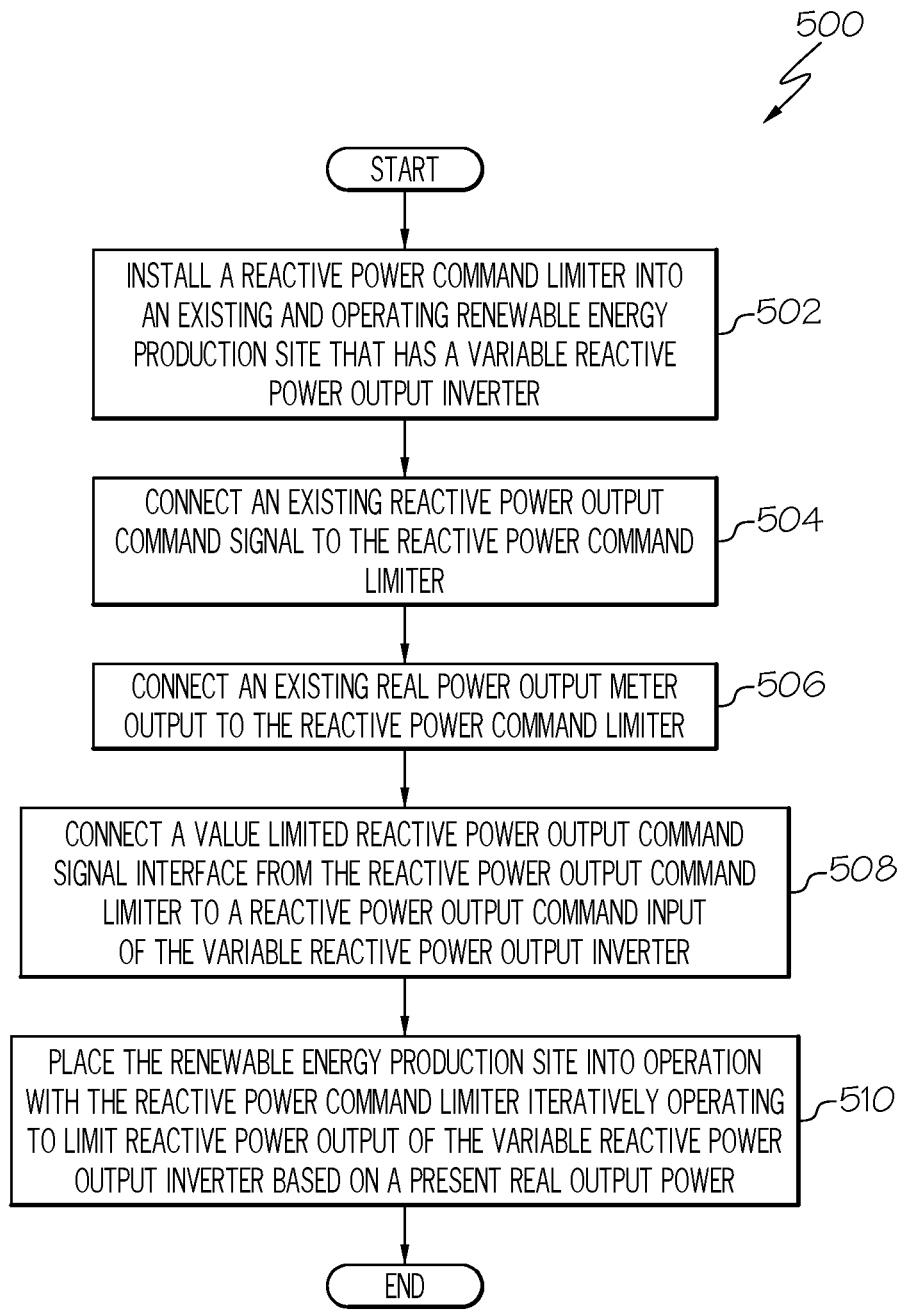
FIG. 5 illustrates a renewable energy site retrofitting process, according to an example.

FIG. 5 illustrates a renewable energy site retrofitting process 500, according to an example. The renewable energy site retrofitting process 500 is an example of a process to retrofit an existing installed power generation site with a reactive power output command value limiter. In an example, the existing installed power generation site includes a variable reactive power output inverter that is able to produce an amount of reactive power that is greater than the amount of real power output that it produces at that time. In an example, the renewable energy site retrofitting process 500 integrates a reactive power output command value limiter, such as the reactive power output command value limiter 214 described above.

The renewable energy site retrofitting process 500 in an example is performed with an existing power generation site, such as a solar generation site, that has a variable reactive power output inverter that does not limit its reactive output based on its present output power. In some examples, a variable reactive power output inverter is controlled to produce an amount of reactive power in order to perform voltage regulation on a power line to which it is providing power. In some examples, the variable reactive power output inverter does not limit the amount of reactive power it produces based on the amount of real power being produced at that time. In other words, the variable reactive power output inverter is able to presently produce an amount of reactive power that is greater than its present real power output. In some examples, certain operating conditions can cause such a variable reactive power output inverter to produce a high level of reactive power while producing a relatively low real power output. Generating a large amount of reactive power, which is able to be significantly in excess of the amount of real power generated by the site, has been observed to disrupt the operation of electrical transmission or distribution systems that receive power from such a variable reactive power output inverter. In one example, solar generation sites have been observed to produce a high level of reactive power during low light periods, such as sunrise and sunset, which are times when the solar cells are producing a low level of power, and thus the variable reactive power output inverter is limited in the amount of real power that con be produced. The retrofitting of a reactive power output command limiter, as is described below, addresses that problem by limiting the reactive power output produced by the site to a level that is based on the real power output produced by the site at that time.

The renewable energy site retrofitting process 500 begins in an example by installing, at 502, a reactive power command limiter into an existing and operating renewable energy production site that has a variable reactive power output inverter. In an example, the renewable energy production site is able to be newly constructed. In further examples, the renewable energy production site is able to have been in operations for sometime when the renewable energy retrofitting process 500 is performed.

The renewable energy site retrofitting process 500 further connects, at 504, an existing reactive power output command signal to the reactive power command limiter. In an example, an existing variable reactive power output inverter receives a reactive power output command value from a control processor. In an example, the control processor determines the reactive power output command value according to a proportional/integral control algorithm. In an example of the renewable energy site retrofitting process 500, this command value is received by the reactive power command limiter and processed to limit the reactive power output command that is ultimately provided to the variable reactive power output inverter.

The renewable energy site retrofitting process 500 further connects, at 506, an existing present real power output meter output to the reactive power command limiter. In an example, a site to be retrofitted has a real power output meter signal available for various uses. This existing meter is used in the present example and that meter produces a signal that reflects the amount of real power being presently produced by the site. The output of that existing real power meter in this example is connected to the reactive power command limiter to provide a present real power output value, which is the amount of real power being produced at that time. In further examples, a suitable present real power meter may not be available at the site, and the retrofit process in such examples further includes installation of a suitable present real power meter.

The renewable energy site retrofitting process 500 connects, at 508, a limited value reactive power output command signal interface from the reactive power output command limiter to a reactive power output command input of the variable reactive power output inverter. In an example, the limited value reactive power output command signal interface is connected to the same input of the variable reactive power output inverter as the reactive power output command value signal was connected to before the reactive power output command signal was connected to the reactive power command limiter.

The renewable energy site retrofitting process 500 places, at 510, the renewable energy production site into operation in conjunction with the reactive power command limiter. In an example, the reactive power command limiter iteratively operates to limit the present reactive power output of the variable reactive power output inverter based on a present real power output value. After placing the retrofitted facility into operation, the renewable energy site retrofitting process 500 ends.

Figure 6:
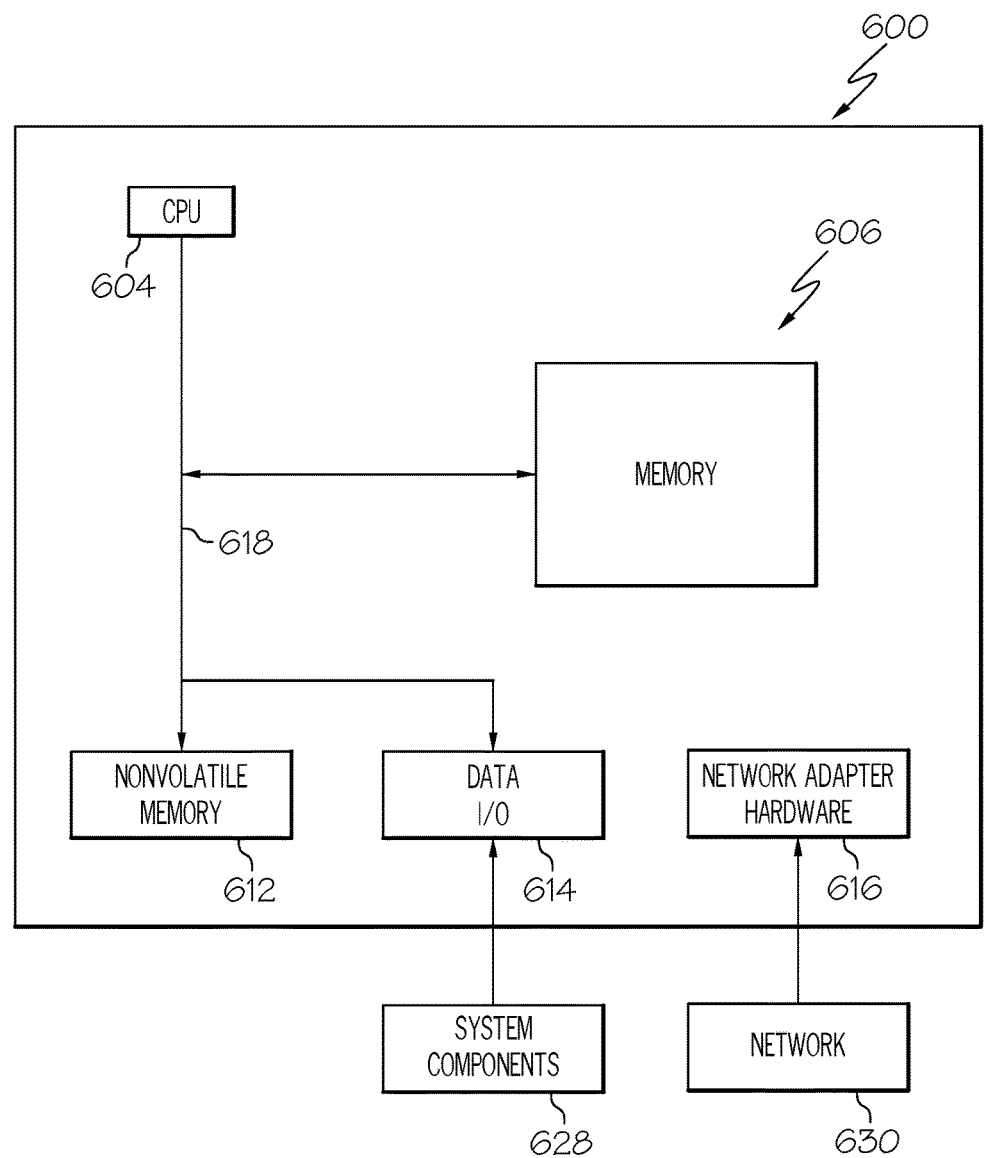
FIG. 6 illustrates a block diagram illustrating a processor, according to an example.

FIG. 6 illustrates a block diagram illustrating a processor 600 according to an example. The processor 600 is an example of a processing subsystem that is able to perform any of the above described processing operations, control operations, other operations, or combinations of these.

The processor 600 in this example includes a CPU 604 that is communicatively connected to a main memory 606 (e.g., volatile memory), a non-volatile memory 612 to support processing operations. The CPU is further communicatively coupled to a network adapter hardware 616 to support input and output communications with external computing systems such as through the illustrated network 630.

The processor 600 further includes a data input/output (I/O) processor 614 that is able to be adapted to communicate with any type of equipment, such as the illustrated system components 628. The data input/output (I/O) processor in various examples is able to be configured to support any type of data communications connections including present day analog and/or digital techniques or via a future communications mechanism. A system bus 618 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method to incorporate control of reactive power produced by a variable reactive power output inverter that is installed in an existing installed power generation site, where the variable reactive power output inverter is able to presently produce an amount of reactive power that is greater than its present real power output, the method comprising:
   integrating a reactive power output command value limiter with the variable reactive power output inverter, where the variable reactive power output inverter is installed and operating prior to the integrating; and
   iteratively performing, with the reactive power output command value limiter:
      receiving a reactive power output command input value;
      determining, based upon a present real power output value of a variable reactive power output inverter, a threshold reactive power output value;
      determining that the reactive power output command input value for the variable reactive power output inverter exceeds the threshold reactive power output value;
      changing, based on the determining that the reactive power output command input value for the variable reactive power output inverter exceeds the threshold reactive power output value, the reactive power output command input value to a limited value reactive power output command that is one of equal to or less than the threshold reactive power output value; and
      outputting, after the changing, the limited value reactive power output command to the variable reactive power output inverter.

2. The method of claim 1, the integrating comprising:
   retrofitting the existing installed power generation site comprising the variable reactive power output inverter, the retrofitting comprising installing a reactive power output command value limiter as a retrofit to the existing installed power generation site to limit a present reactive power output of the variable reactive power output inverter based on a present real power output of the variable reactive power output inverter;
   coupling an existing reactive power output command signal to the reactive power output command value limiter to provide the reactive power output command input value;
   coupling a present real power output meter output to the reactive power output command value limiter to provide the present real power output value;
   coupling a limited value reactive power output command signal from the reactive power output command value limiter to the variable reactive power output inverter to communicate the limited value reactive power output command; and
   placing the variable reactive power output inverter into operation in conjunction with the reactive power output command value limiter where the reactive power output command value limiter iteratively operates to limit reactive power output of the variable reactive power output inverter based on the present real power output value received via the present real power output meter output.

3. The method of claim 1, wherein determining the threshold reactive power output value is based upon a specified power factor value for an electrical output at a site output power connection, and wherein, outputting the limited value reactive power output command comprises setting a present output power factor for the variable reactive power output inverter.

4. The method of claim 1, wherein the present real power output value of the variable reactive power output inverter is calculated based upon a measured input power value of power supplying the variable reactive power output inverter.

5. The method of claim 1,
wherein the reactive power output command input value is determined, prior to the receiving, with a proportional/integral control algorithm,
wherein the changing is performed on the reactive power output command input value of the proportional/integral control algorithm.

6. The method of claim 1, wherein the variable reactive power output inverter receives power from a photovoltaic solar collection system.

7. The method of claim 1, wherein the reactive power output command input value is determined independently of the present real power output value of the variable reactive power output inverter and is determined to perform voltage regulation at a site output power connection.

8. The method of claim 7, wherein the changing and outputting are performed based on the present real power output of the variable reactive power output inverter being limited by an input power level into the variable reactive power output inverter.

9. A retrofittable reactive power output command value limiter that is suitable for integration with a variable reactive power output inverter that is able to produce an amount of reactive power that is greater than a present real power output of the variable reactive power output inverter, where the variable reactive power output inverter is installed in an existing installed power generation site, the retrofittable reactive power output command value limiter comprising:
a reactive power output command value input that, when operating, is configured to receive a reactive power output command input value; and
a limited value reactive power output command calculator, communicatively coupled to the reactive power output command value input, that when operating is configured to iteratively perform:
determine, based upon a present real power output value of the variable reactive power output inverter, a threshold reactive power output value;
determine that the reactive power output command input value exceeds the threshold reactive power output value; and
change, based on a determination that the reactive power output command input value exceeds the threshold reactive power output value, the reactive power output command input value to a limited value reactive power output command that is one of equal to or less than the threshold reactive power output value; and
output, after the changing, the limited value reactive power output command to the variable reactive power output inverter.

10. The retrofittable reactive power output command value limiter of claim 9, further comprising:
a real power output meter interface, communicatively coupled to the limited value reactive power output command calculator, suitable for coupling to a present real power output meter output, the real power output meter interface, when operating, being configured to receive the present real power output value; and
a limited value reactive power output command interface, communicatively coupled to the limited value reactive power output command calculator, suitable for coupling to a reactive power output command input of the variable reactive power output inverter, the limited value reactive power output command interface, when operating, being configured to output the limited value reactive power output command.

11. The retrofittable reactive power output command value limiter of claim 9, where the limited value reactive power output command calculator, when operating, is further configured to:
determine the threshold reactive power output value based upon a specified power factor value for an electrical output at a site output power connection; and
output the limited value reactive power output command by at least setting a present output power factor for the variable reactive power output inverter.

12. The retrofittable reactive power output command value limiter of claim 9, wherein the present real power output value of the variable reactive power output inverter is calculated based upon a measured input power value of power supplying the variable reactive power output inverter.

13. The retrofittable reactive power output command value limiter of claim 9, where the reactive power output command value input is suitable for connection to an output of a proportional/integral feedback control system, the reactive power output command value input, when operating, is further configured to receive, prior to the changing, the reactive power output command value from a proportional/integral control algorithm performed by the proportional/integral feedback control system.

14. The retrofittable reactive power output command value limiter of claim 9, wherein the variable reactive power output inverter receives power from a photovoltaic solar collection system.

15. The retrofittable reactive power output command value limiter of claim 9, wherein the reactive power output command input value is determined independently of the present real power output value of the variable reactive power output inverter, and is further determined to perform voltage regulation at a site output power connection.

16. The retrofittable reactive power output command value limiter of claim 15, wherein the limited value reactive power output command calculator, while operating, is configured to iteratively perform the change and output based on the present real power output value of the variable reactive power output inverter being limited by an input power level into the variable reactive power output inverter.

17. A method of retrofitting an existing installed power generation site comprising a variable reactive power output inverter that is able to produce an amount of reactive power that is greater than a present real power output of the variable reactive power output inverter, the method comprising:
retrofitting the existing installed power generation site comprising the variable reactive power output inverter, the retrofitting comprising installing a reactive power output command value limiter as a retrofit to the existing installed power generation site to limit reactive power output of the variable reactive power output inverter based on a present real power output of the variable reactive power output inverter in order to maintain a minimum power factor;
coupling an existing reactive power output command signal to the reactive power output command value limiter;

coupling an existing present real power output meter output to the reactive power output command value limiter;

coupling a limited value reactive power output command signal from the reactive power output command value limiter to the variable reactive power output inverter to communicate the limited value reactive power output command; and placing the variable reactive power output inverter into operation in conjunction with the reactive power output command value limiter where the reactive power output command value limiter iteratively operates to limit reactive power output of the variable reactive power output inverter based on the present real power output.

* * * * *